US005726395A

United States Patent [19]

[11] Patent Number: 5,726,395

Anagnos

[45] Date of Patent: Mar. 10, 1998

[54] ISOLATION/DAMPING MOUNTING SYSTEM FOR LOUDSPEAKER CROSSOVER NETWORK

[75] Inventor: Daniel P. Anagnos, Grandview, N.Y.

[73] Assignees: Sony Corporation, Japan; Sony Electronics Inc.

[21] Appl. No.: 741,013

[22] Filed: Oct. 30, 1996

[51] Int. Cl.[6] .......................... A47B 81/06; F16M 13/00

[52] U.S. Cl. .......................... 181/141; 181/199; 248/635

[58] Field of Search .......................... 181/151, 146, 181/199, 207, 208, 141; 381/87, 88, 158, 159; 248/635, 636, 638; 267/136, 293

[56] References Cited

U.S. PATENT DOCUMENTS

| | | | |
|---|---|---|---|
| 4,730,694 | 3/1988 | Albarino | 181/199 X |
| 5,348,267 | 9/1994 | Lanting et al. | 248/635 |
| 5,400,408 | 3/1995 | Lundgren et al. | 381/88 |

OTHER PUBLICATIONS

Sorbothane Manual, "The Ultimate Damping & Isolation Material, " Sorbothane Inc., 2144 State Route 59, Kent, OH 44240, Jun. 1995.

Bostik Manual, Product Data: Bostik 7132/Boscodur #4, Bostik Chemical Group, Middleton, MA 01949, Sep. 1983.

*Primary Examiner*—Khanh Dang

*Attorney, Agent, or Firm*—Ronald P. Kananen

[57] ABSTRACT

A mechanical mounting system and extensional damping technique for loudspeaker crossover networks. This system decouples the crossover network from the loudspeaker enclosure (cabinet), isolating it from any vibrational energy in the cabinet walls. In addition, an extensional damping material is applied to the crossover network to damp any vibrational energy which may be coupled from the surrounding air into the network. The mounting system can be used for mounting any sensitive electronic components within an enclosure to provide isolation from the walls of the enclosure and from surrounding or environmentally induced vibrational energy.

14 Claims, 4 Drawing Sheets

ISOLATION/DAMPING MOUNTING SYSTEM FOR LOUDSPEAKER CROSSOVER NETWORK

BACKGROUND OF THE INVENTION

1. Field of the Invention

The present invention relates generally to mechanical mounting arrangements and, in particular, to a mechanical mounting system and extensional damping technique for loudspeaker crossover networks.

2. Description of the Relevant Art

Loudspeaker crossover networks (the electrical filtering and equalization circuitry of a loudspeaker) are very prone to low level intermodulation distortion effects when exposed to vibrational energy. This often becomes critical when the crossover networks are mounted within the loudspeaker cabinet where vibrational energy may be propagating freely though the cabinet walls and the interior air. Since most crossover networks are rigidly mounted to the cabinet walls, vibrational energy is directly coupled into the network. Energy coupled from the cabinet usually will travel though the network mounting screws, pc board or mounting board (if hard-wired) and into the electrical components themselves. It is also possible for vibrational energy in the internal air of the cabinet to be coupled either directly into the electrical components or through the pc board or mounting board into the components. The effects of this vibrational energy, when coupled into the electrical components, are typically manifested as a masking of low level detail and a subtle, but perceivable, intermodulation of the desired audio signal.

Manufacturers have attempted to address this problem in several different ways, including: (1) mounting the crossover networks outside of the loudspeaker cabinet; (2) encasing the crossover network in a highly damped potting compound; and (3) isolating the crossover networks within the cabinet by hanging them from wires or springs.

Mounting the loudspeaker networks outside of the cabinet offers improved performance since the cabinet walls and interior air of the loudspeaker can no longer couple vibrational energy into the networks. Unfortunately, vibrational energy can be coupled from the air in the listening environment (i.e., the loudspeaker's output energy) into the networks. Therefore, the networks still must be isolated in some manner from vibrational energy in the air. Mounting the networks outside of the cabinet usually will require an additional enclosure and its associated external wiring complications and additional electrical connections, as well as significant added cost.

Encasing the crossover networks in a highly damped potting compound can offer improved performance provided the damping characteristics of the potting compound are sufficient. However, this method has the disadvantages of poor heat dissipation from the network components, lack of repairability and high cost.

Other methods of isolation, such as hanging the networks, are usually either ineffective or overly complex. The effectiveness of hanging the networks is completely dependent upon the transmissibility characteristics of the hanging system (e.g., the wires or springs). The hanging system may not isolate adequately at all frequencies. In particular, if the hanging system resonance is too high, amplification of vibrational energy will occur, making the problem worse. A hanging system also does nothing about airborne vibrational energy within the cabinet. Hanging systems are also prone to shipping damage if the cabinet encounters rough handling.

SUMMARY OF THE INVENTION

It is an object of the present invention to provide a mounting system and extensional damping technique for loudspeaker crossover networks that overcomes the problems associated with the existing mounting systems described above.

More specifically, it is an object of the present invention to provide a mounting system that isolates electrical components from vibrations in the walls of an enclosure and from surrounding or environmentally induced vibrational energy, that does not interfere with heat dissipation from or repair of the electrical components, that is inexpensive and not overly complex, that is not prone to shipping damage, and that will isolate adequately at all frequencies encountered.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention provides an isolation grommet/ferrule mounting system for damping and acoustically isolating crossover components of a loudspeaker from the speaker cabinet and from airborne vibrations within the cabinet. The elimination and damping of all cabinet, driver, and crossover resonance, allows the natural resonance of music to be conveyed in a more revealing and realistic way with minimum distortion.

In order to achieve the objects set forth above, the present invention comprises a mounting system for mounting an electronic component within an enclosure. The mounting system comprises a board on which the electronic component is secured, the board comprising at least one mounting slot, an extensional damping material disposed between the board and a surface of the enclosure, a grommet inserted into the mounting slot, the grommet having surfaces which sandwich the board about a periphery of the mounting slot, a ferrule inserted into the grommet, the ferrule having an enlarged head which engages a surface of the grommet and a shank which extends through the grommet and engages the surface of the enclosure, and a mounting screw inserted through the ferrule and anchored into the surface of the enclosure, the mounting screw having a screw head in engagement with the enlarged head of the ferrule.

In a preferred embodiment, the extensional damping material covers at least 50% of the surface area of a side of the board facing the surface of the enclosure and is bonded to the board. The grommet may comprise an internally ribbed grommet or a shear grommet, depending on the particular application.

In a further aspect of the present invention, the objects set forth above are achieved by a method for mounting an electronic component within an enclosure. The method comprises the steps of securing the electronic component to a board, attaching at least one grommet to the board, inserting a ferrule into the at least one grommet, placing an extensional damping material between the board and a surface of the enclosure, and inserting a screw through the ferrule and anchoring the screw to the enclosure.

The method preferably comprises attaching the extensional damping material to the board before anchoring the screw to the enclosure. The method also preferably comprises providing a plurality of mounting slots in the board, and attaching a plurality of grommets to the board such that portions of the board adjacent the mounting slots are sandwiched between two surfaces of each grommet. The screw is preferably tightened to a specified torque and a preload is applied to the extensional damping material and to the grommet as the screw is anchored.

In accordance with yet another aspect of the present invention, the objects set forth above are achieved in a loudspeaker having an improved mounting system for isolating vibrational energy from a crossover network. The loudspeaker comprises a speaker cabinet, at least one crossover network, and a mounting system for mounting the crossover network to the speaker cabinet. The mounting system comprises a board on which the crossover network is supported, the board comprising a plurality of mounting slots spaced about a periphery thereof, an extensional damping material disposed between the board and a surface of the speaker cabinet, a grommet inserted into each of the mounting slots, the grommets each having surfaces which sandwich portions of the board adjacent the mounting slots, a ferrule inserted into each of the grommets, the ferrules each having an enlarged head which engages a surface of a respective grommet and a shank which extends through the respective grommet and engages the surface of the speaker cabinet, and a mounting screw inserted through each of the ferrules and anchored into the surface of the loudspeaker cabinet, the mounting screws each having a screw head in engagement with the enlarged head of a respective ferrule.

The extensional damping material used in the present invention preferably comprises a thermoset, polyether-based polyurethane with high energy absorption and pliability. The mounting system is preferably constructed to have a natural resonance frequency which is less than a lowest frequency reproduced by the crossover network by a factor of 0.707 or less.

BRIEF DESCRIPTION OF THE DRAWINGS

The various features and advantages of the present invention will become more clearly appreciated as a description is made with reference to the appended drawings. In the drawings.

DETAILED DESCRIPTION OF INVENTION

Preferred embodiments of the present invention will be described below by making reference to FIGS. 1 to 6(B) of the drawings.

Figure 1:
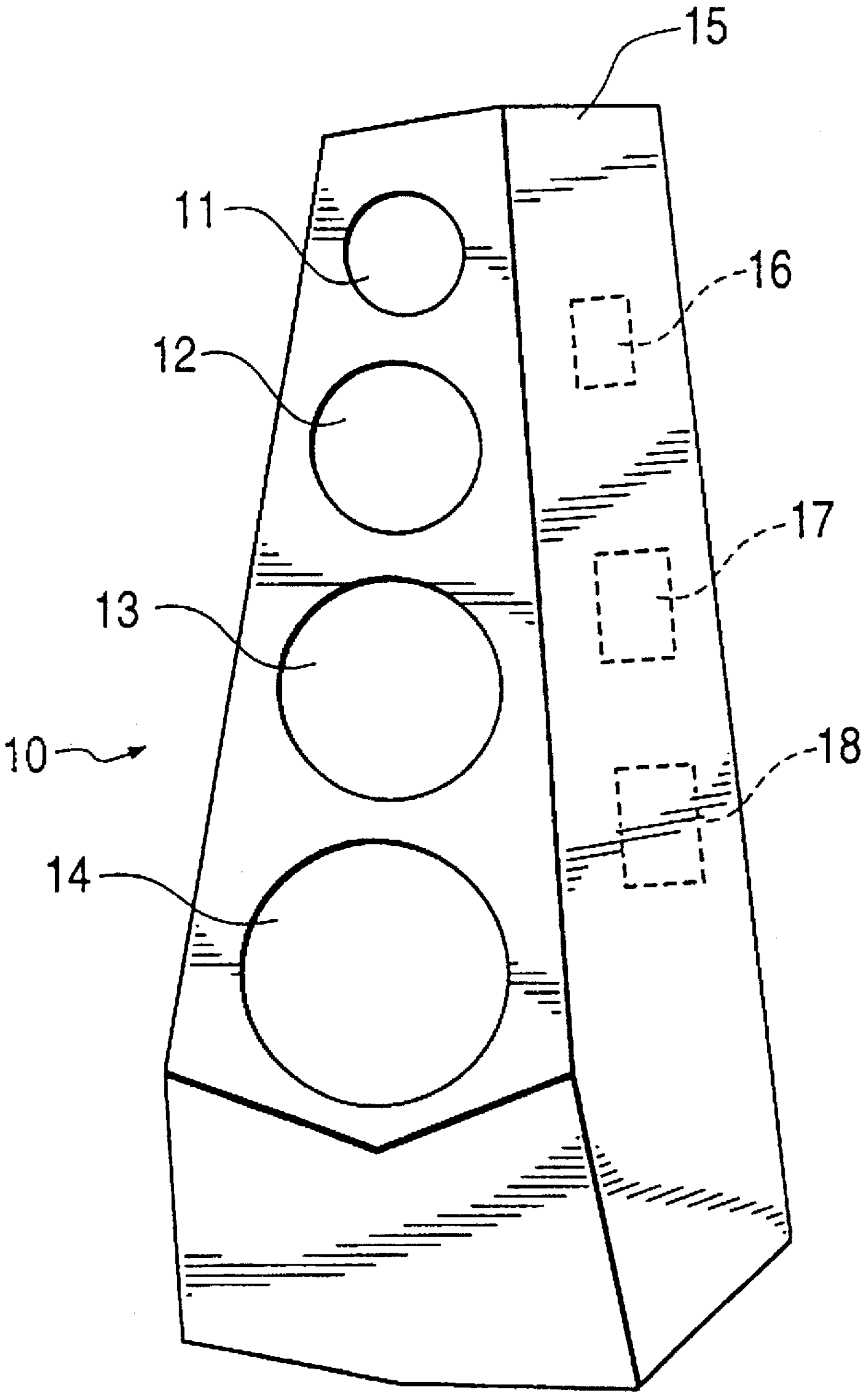
FIG. 1 is a perspective view of a loudspeaker equipped with a mounting system for crossover networks according to the present invention.

The present invention was developed for use in a high performance loudspeaker, such as the loudspeaker 10 shown in FIG. 1. The loudspeaker includes a plurality of speaker components 11, 12, 13, 14 (e.g., tweeter, midrange, woofer, etc.). The speaker components are mounted within a speaker cabinet 15, which also supports other electrical components, such as crossover networks 16, 17, 18. The crossover networks 16, 17, 18 provide electrical filtering and equalization of the speaker system. The crossover networks 16, 17, 18 each comprise a pc board or mounting board (if hard wired) having sensitive electronic components mounted thereon which are prone to low level intermodulation distortion effects when exposed to vibrational energy.

The mounting system of the present invention decouples the crossover networks 16, 17, 18 from the loudspeaker cabinet 15, thereby isolating the networks from any vibrational energy in the cabinet walls. In addition, an extensional damping material is applied to the crossover networks 16, 17, 18 to damp any vibrational energy which may be coupled from the surrounding air into the networks.

Figure 2A:
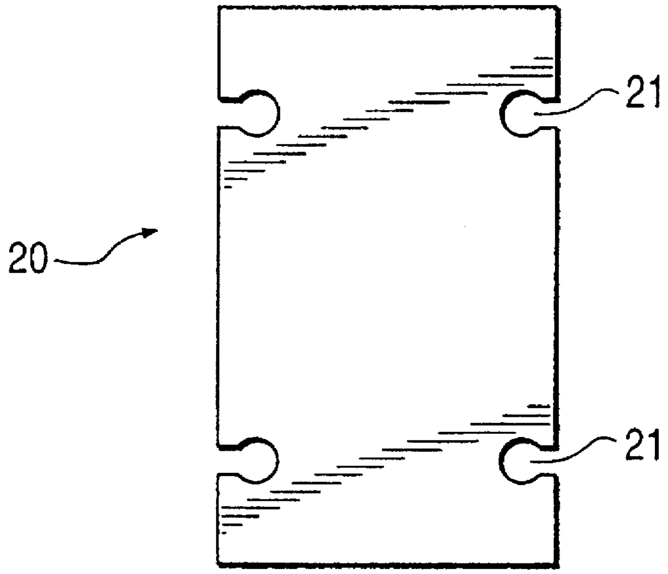
FIGS. 2(A) and 2(B) are plan views of slotted pc boards for the crossover networks of the present invention.
Figure 2B:
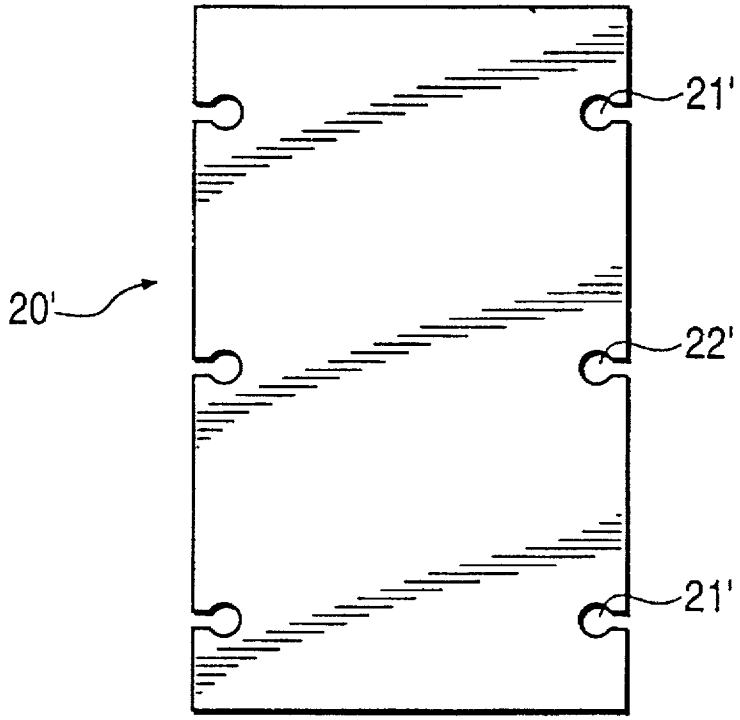

As shown in FIGS. 2(A) and 2(B), the pc boards or mounting boards 20, 20' each have mounting slots 21, 21' spaced around a periphery thereof for mounting the boards 20, 20' to the speaker cabinet 15. The mounting slots 21, 21' are designed to maximize the contact area with the mounting assembly while allowing for easy assembly. A relatively small, lightweight crossover network may use a pc board or mounting board 20 having mounting slots 21 adjacent each corner, as shown in FIG. 2(A). On the other hand, a relatively large, heavy crossover network may use a pc board or mounting board 20' equipped with additional mounting slots 22' along a side thereof for support, as shown in FIG. 2(B).

Figure 3:
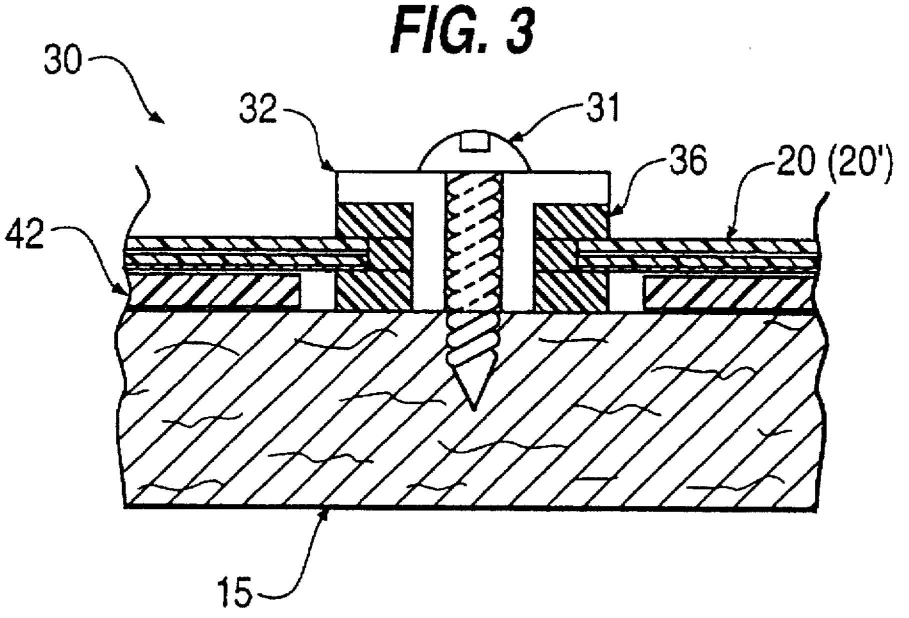
FIG. 3 is a cross sectional view of a mounting system according to the present invention.
Figure 4A:
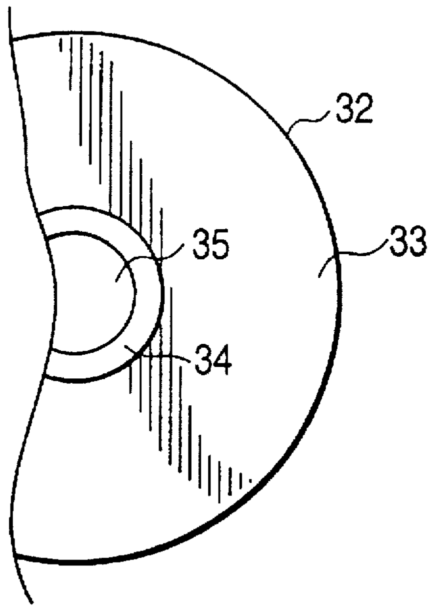
FIGS. 4(A) and 4(B) are an end view and a cross sectional view, respectively, of a ferrule used in the mounting system shown in FIG. 3.
Figure 4B:
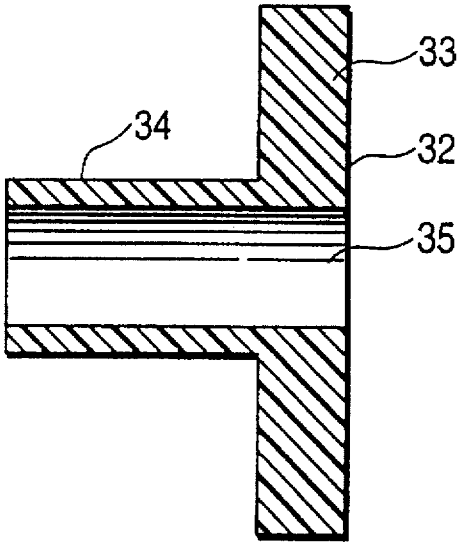
Figure 5A:
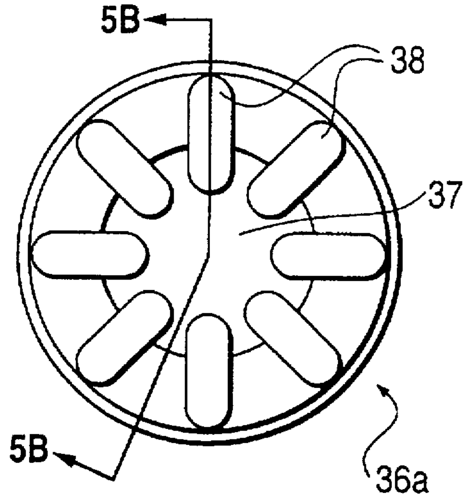
FIGS. 5(A) and 5(B) are an end view and a cross sectional view, respectively, of a grommet used in the mounting system according to a first embodiment of the present invention.
Figure 5B:
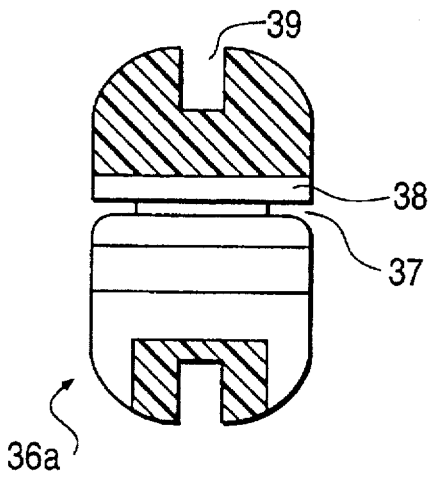

FIG. 3 shows the details of the mounting system 30 according to the present invention. The mounting system 30 utilizes three parts for mechanical decoupling and isolation of the loudspeaker crossover network mounting board 20, 20' from the loudspeaker cabinet wall 15. First, a mounting screw 31 is provided for securing the mounting system to the cabinet wall 15. The mounting screw 31 is preferably a wood screw or machine screw with a head diameter large enough to fully contact the top surface of a ferrule 32. The screw 31 extends through the ferrule 32 and into the cabinet wall 15. The screw 31 is designed to attach to the medium density fiberboard (MDF) cabinet walls of the loudspeaker 10. The screw 31 preferably has a truss head, a #6 particle board thread, and may have a length of 25 mm, for example.

The ferrule 32 is a plastic or metal bushing-type structure having an enlarged head 33 and a shank 34 having a central bore 35 extending therethrough. The ferrule 32 has three purposes: (1) to distribute the screw head pressure over the entire top surface area of an isolation grommet 36; (2) to allow for a precise preloading (e.g., 5%) of the grommet 36 for optimum isolation; and (3) to limit compression deflection of the grommets 36, especially during installation of the screws 31. The dimensions of the ferrules 32 are optimized for the type of isolation grommet 36 used. The ferrules 32 are preferably machined from polyethylene.

The isolation grommet 36 is preferably a highly damped urethane elastomer exhibiting high internal losses, controlled transmissibility, uniform modulus and a high resistance to creep and compression set. There are two types of grommet designs that can be used with the mounting system: an internally ribbed type for higher static loads (see FIGS. 5(A) and 5(B)) and a low static load shear type (see FIGS. 6(A) and 6(B)).

The type of grommet 36 used and the total number of mounting points around each pc board or mounting board 20, 20' are determined by the mass and size of the crossover network 16, 17, 18 itself, as well as the amount of shear and compressive loading encountered. The amount of shear and compressive loading encountered will depend, in part, on whether the crossover networks 16, 17, 18 are mounted within the speaker cabinet 15 vertically, horizontally, or at an angle.

The two types of grommets 36 used in the mounting system of the present invention can be, for example, those produced by E-A-R Specialty Composites, a division of Cabot Safety Corporation, from their ISOLOSS VL® material. The grommet **36*a* shown in FIGS. 5(A) and 5(B) corresponds to E-A-R Specialty Composites part number G-411-V. The grommet 36*a* is generally circular in plan view and has a central bore 37 extending therethrough. A plurality of internal ribs 38 are spaced about a circumference of the central bore 37. A groove 39 extends about an outer circumference of the grommet 36*a* for receiving and sandwiching an edge of the board 20, 20' adjacent the mounting slots 21, 21', 22' when the grommet 36*a* is assembled to the board 20, 20'. The grommet 36*a*** preferably has a dynamic stiffness of approximately 230 lbs/inch in an axial direction, and 139 lbs/inch in a radial direction.

Figure 6A:
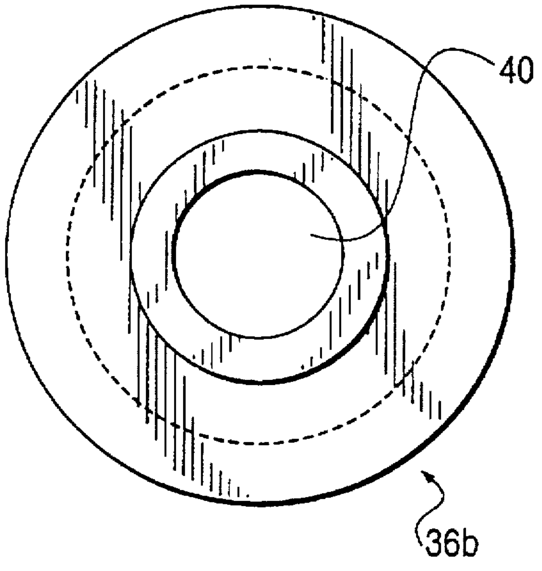
FIGS. 6(A) and 6(B) are an end view and a cross sectional view, respectively, of a grommet used in the mounting system according to a second embodiment of the present invention.
Figure 6B:
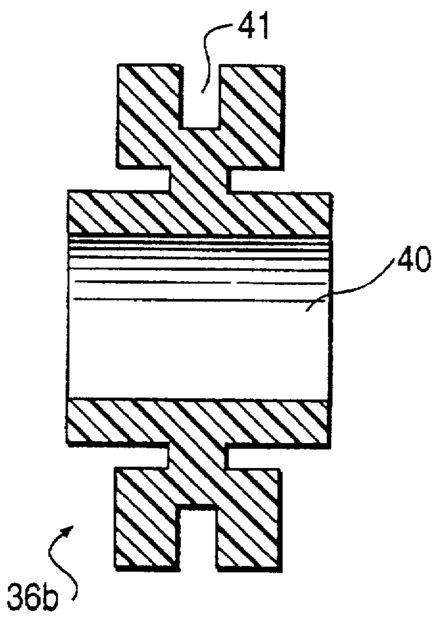

The grommet **36*b* shown in FIGS. 6(A) and 6(B) corresponds to E-A-R Specialty Composites part number G-601-V. The grommet 36*b* is generally circular in plan view and has a central bore 40 extending therethrough. A groove 41 extends about an outer circumference of the grommet 36*b* for receiving and sandwiching an edge of the board 20, 20' adjacent the mounting slots 21, 21', 22' when the grommet 36*b* is assembled to the board 20, 20'. The grommet 36*b*** preferably has a dynamic stiffness of approximately 46 lbs/inch in an axial direction, and 87 lbs/inch in a radial direction.

The grommets 36 are preferably made of a moldable urethane compound that combines good damping with stable material properties over a broad temperature range. The following Table 1 provides a listing of acceptable physical and strength properties for the grommet material according to the preferred embodiment.

TABLE 1

PROPERTIES OF GROMMET MATERIAL

| PROPERTY | TEST METHOD | TEST RESULTS |
|---|---|---|
| Hardness (nominal) | ASTM D2240 | |
| | Shore 00 | 70 |
| | Shore A | 24 |
| Load/Deflection | ASTM D575 | |

TABLE 1-continued

PROPERTIES OF GROMMET MATERIAL

| PROPERTY | TEST METHOD | TEST RESULTS |
|---|---|---|
| | Compression Modulus, psi | 137 |
| | Load @ 15% Compression, psi | 20.6 |
| Compression Set | ASTM D395 - Method B | |
| | @22C. | 4.5% |
| | @30C. | 4.2% |
| Flammability | UL 94 Vertical | |
| | 1/8 in thickness | Meets V-0 |
| Rebound | ASTM D2632 | |
| | @ 20C. (1st impact) | 23% |
| Tensile Strength | ASTM D638 | |
| | Strength, psi | 256 |
| | Elongation at break, % | 900 |
| Tear Strength | ASTM D624 - Die C, lbf/in | 35 |

The mounting system 30 of the present invention is optimized in terms of its axial and radial dynamic stiffness such that the natural resonance frequency, $f_n$, is less than the lowest frequency, $f_d$, reproduced by the crossover network 16, 17, 18, by a factor of 0.707 or less. This is critical since the natural resonance $f_n$ represents the region of maximum amplification, and frequencies above $1.414f_n$ represent the region of maximum isolation. The operating bandwidth of the crossover network 16, 17, 18 should be completely within the isolation region of the mounting system 30.

In order to damp any vibrational energy which may enter the crossover network 16, 17, 18 from the air, an optimized extensional damping material 42 is attached to the underside of the pc board or mounting board 20, 20'. The extensional damping material 42 must cover at least 50% of the surface area of the pc board or mounting board 20, 20' for effective damping. The extensional damping material 42 is a thermoset, polyether-based polyurethane with high energy absorption and pliability. The extensional damping material 42 can have a thickness of 3.2 mm and a durometer of 30, for example. It is critical that the extensional damping material 42 be highly isolating (i.e., possess very low transmissibility) so that a path for the transmission of vibrational energy from the cabinet wall 15 to the pc board or mounting board 20, 20' is not created. In addition the extensional damping material 42 must not cause the natural resonance ($f_n$) of the mounting system 30 to increase into the operational bandwidth of the crossover network 16, 17, 18.

An extensional damping material which is suitable for the present invention is manufactured under the proprietary name Sorbothane® by Sorbothane, Inc. The following Table 2 provides a listing of acceptable physical and strength properties for the extensional damping material 42 according to the preferred embodiment.

TABLE 2

PROPERTIES OF EXTENSIONAL DAMPING MATERIAL

| PROPERTY | TEST METHOD | DUROMETER 30 | DUROMETER 50 | DUROMETER 70 |
|---|---|---|---|---|
| Density | | | 80 lbs/ft$^3$ | |
| Specific Gravity | | | 1.3 | |
| Hardness | Shore '00' Scale | | 25 to 80 | |
| Glass Transition | | −50° F. | −45° F. | −40° F. |
| Rebound Resilience | Lupke Rebound Test | 10% | 13.2% | 15% |

TABLE 2-continued

PROPERTIES OF EXTENSIONAL DAMPING MATERIAL

| PROPERTY | TEST METHOD | DUROMETER 30 | 50 | 70 |
| --- | --- | --- | --- | --- |
| Expansion/Contr. Coefficient | −58° F. to 212° F. | | $7.35 \times 10^{-5}$ in/in °F. | |
| Compression Set | ASTM 395 Method 72 hr/73 F.-25% Compression | 9.7% | 6.2% | 4.5% |
| Compressive | ASTM D575 20% | 5.4 psi | 12.4 | 23.7 |
| Stress & Strain | Method A 50% | 44.0 | 89.0 | 190.0 |
| Elongation at Break | ASTM D 412 80 500 mm/min @20° C. | 500% | 500% | 300% |
| Tensile Strength at Break | ASTM D 412 | 75 psi | 124.7 | 155 |
| Tensile Elastic | ASTM D41280 100% | 16 psi | 27 | 71 |
| Stress-Strain | 500 mm/min 200% | 32 | 60 | 125 |
| | @20° C. 300% | 53 | 90 | 148 |
| Tear Strength | ASTM 624 with 1 mm nick | 17.2 psi | 23.5 | 29.0 |

The extensional damping material 42 has a pressure sensitive adhesive (PSA) backing. The crossover network pc boards or mounting boards 20, 20' are preferably covered on the copper or solder side by the damping material 42, with greater than 80% of the surface area of one side of the boards 20, 20' covered. The damping material 42 has a high level of pliability that allows it to conform around the solder joints and other surface discontinuities on the pc board or mounting board 20, 20'. The mounting system 30 allows enough clearance between the pc board 20, 20' and the cabinet wall 15 to prevent over-compression of the damping material 42 (approximately 5% preloading is preferred). In addition, all electrical components are attached to the pc board or mounting board 20, 20' using a highly damping silicone adhesive.

In a high performance loudspeaker 10 according to the preferred embodiment of the present invention there are three separate crossover networks: a high frequency network 16, a mid frequency network 17, and a low frequency network 18. All are mounted in primarily shear load (i.e., with a lesser degree of compressive loading) to the angular, vertical walls of the loudspeaker cabinet 15. The low frequency crossover network 18 is supported by the internally ribbed grommets **36*a* (FIGS. 5(A) and 5(B)) at six attachment points 21', 22' (FIG. 2(B)) due to its significantly higher mass. The mid frequency crossover network 17 is supported by the shear mode grommets 36*b* (FIGS. 6(A) and 6(B)) at six attachment points 21', 22' (FIG. 2(B)). The high frequency crossover network 16, which has a lower mass, is also supported by shear mode grommets 36*b* but at only four attachment points 21 (FIG. 2**(A)).

During production of a loudspeaker 10 equipped with the present invention, the following general procedure is followed:

1. The extensional damping material 42 is attached to the network pc boards or mounting boards 20, 20' as a subassembly procedure.

2. The grommets 36 are attached to the network pc boards 20, 20' as a subassembly procedure. Because the grommets 36 are very soft (pliable) they can be refrigerated prior to assembly to facilitate handling.

3. During final assembly the networks 16, 17, 18 are located in the cabinet 15, the ferrules 32 are inserted into the grommets 36, and the screws 31 are inserted through the ferrules 32. Finally, the screws 31 are tightened to a specified torque.

Besides the application of this invention to the mounting of crossover networks within a loudspeaker enclosure, all of the principles and concepts could be applied to crossover networks mounted outside of a loudspeaker cabinet (e.g., in an outboard enclosure). Also, as pointed out above, the principles and concepts of the present invention apply equally whether the crossover network utilizes a pc board or the components are hard-wired and attached to a mounting board. The principles and concepts of the invention improve performance of the loudspeaker whether the components of the crossover network are passive (e.g., capacitors, inductors, resistors) or active (e.g., diodes, transistors, ICs).

The mounting system of the present invention has other alternative uses. For example, the mounting system can be used for mounting active, electronic crossovers and amplifiers, or any other electronic circuitry within a loudspeaker enclosure. Active (powered) loudspeakers and subwoofers are typical products which would benefit from the present invention.

In general, the mounting system of the present invention is suitable for mounting any sensitive electronic components within an enclosure. The mounting system is not limited to a loudspeaker enclosure, but applies to any electronic enclosure or case. Examples include: high end D/A converters, sensitive DSP circuitry, CD players, very sensitive analog circuitry in high end electronics, high gain analog microphone circuitry, and so forth. In all of these cases, isolation from surrounding or environmentally induced vibrational energy is the objective.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

The invention claimed is:

1. A loudspeaker having an improved mounting system for isolating vibrational energy from a crossover network, comprising:

a speaker cabinet;

at least one crossover network; and a mounting system for mounting said at least one crossover network to said speaker cabinet, said mounting system comprising:

a board on which the crossover network is supported, said board comprising a plurality of mounting slots spaced about a periphery thereof;

an extensional damping material disposed between the board and a surface of the speaker cabinet;

a grommet inserted into each of said mounting slots, said grommets each having surfaces which sandwich portions of said board adjacent said mounting slots;

a ferrule inserted into each of said grommets, said ferrules each having an enlarged head which engages a surface of a respective grommet and a shank which extends through the respective grommet and engages the surface of the speaker cabinet; and a mounting screw inserted through each of said ferrules and anchored into the surface of the loudspeaker cabinet, said mounting screws each having a screw head in engagement with the enlarged head of a respective ferrule.

2. The loudspeaker according to claim 1, wherein said extensional damping material covers at least 50% of the surface area of a side of the board facing the surface of the loudspeaker cabinet.

3. The loudspeaker according to claim 1, wherein said extensional damping material is bonded to said board.

4. The loudspeaker according to claim 1, wherein at least one of said grommets comprises an internally ribbed grommet.

5. The loudspeaker according to claim 1, wherein at least one of said grommets comprises a shear grommet.

6. The loudspeaker according to claim 1, wherein said extensional damping material comprises a thermoset, polyether-based polyurethane with high energy absorption and pliability.

7. The loudspeaker according to claim 1, wherein a natural resonance frequency of the mounting system is less than a lowest frequency reproduced by the crossover network by a factor of 0.707 or less.

8. A mounting system for mounting an electronic component within an enclosure, comprising:

a board on which the electronic component is secured, said board comprising at least one mounting slot;

an extensional damping material disposed between the board and a surface of the enclosure;

a grommet inserted into said at least one mounting slot, said grommet having surfaces which sandwich said board about a periphery of said mounting slot;

a ferrule inserted into said grommet, said ferrule having an enlarged head which engages a surface of the grommet and a shank which extends through said grommet and engages the surface of the enclosure; and a mounting screw inserted through said ferrule and anchored into the surface of the enclosure, said mounting screw having a screw head in engagement with the enlarged head of the ferrule, wherein said board comprises a plurality of mounting slots, each of said mounting slots having a grommet, a ferrule, and a mounting screw arranged therein for securing the board to the enclosure.

9. The mounting system according to claim 8, wherein said extensional damping material covers at least 50% of the surface area of a side of the board facing the surface of the enclosure.

10. The mounting system according to claim 8, wherein said extensional damping material is bonded to said board.

11. The mounting system according to claim 8, wherein said grommet comprises an internally ribbed grommet.

12. The mounting system according to claim 8, wherein said grommet comprises a shear grommet.

13. The mounting system according to claim 8, wherein said board comprises a plurality of mounting slots, each of said mounting slots having a grommet, a ferrule, and a mounting screw arranged therein for securing the board to the enclosure.

14. The mounting system according to claim 8, wherein said electrical component is a crossover network for a loudspeaker.

* * * * *